June 25, 1929.  H. N. PUTNAM  1,718,252

WALL CONDUIT

Original Filed May 16, 1927

INVENTOR
Herbert N. Putnam
BY Evans + McCoy
ATTORNEYS

Patented June 25, 1929.

1,718,252

UNITED STATES PATENT OFFICE.

HERBERT N. PUTNAM, OF LAKEWOOD, OHIO.

WALL CONDUIT.

Application filed May 16, 1927, Serial No. 191,565. Renewed February 23, 1929.

This invention relates to a wall construction in which a conduit for electric wiring, pipes or the like may be installed. In buildings it is frequently necessary and desirable to have electrical wiring, water, gas, air or other piping to individual units of the building such as offices, apartments, or the like, and such wiring or piping is ordinarily permanently enclosed in the walls of the building so that alterations in the connections to suit the convenience of the tenants or occupants is quite expensive.

It is the principal object of this invention to provide a wall construction having a conduit therein which is of sufficient size to provide space for suply lines at any part of the room, such as wiring and pipe lines, and which is readily accessible for the purpose of altering the connections to any of such lines or making new connections, or for repairing any of the wiring or piping.

The present invention provides a conduit in a wall by means of a channel shaped metallic structural member forming a part of the body of the wall and a detachable concealing plate or cover plate which may also serve as a base plate, chair rail or molding. A further object is to form the edge of one or more of the flanges of the structural member to serve as a plaster ground.

It is an object of this invention to provide a conduit for wiring, pipes and the like which conduit is entirely within the wall and forms a part thereof, and which conduit is entirely concealed by a suitable cover plate, such as a base plate, chair rail or molding, so that no room space is wasted and no unsightly wires or piping are exposed.

A further object is to provide a base plate, chair rail, molding or the like to which connections may readily be made with the wires or pipes within the conduit by providing outlets at the desired points.

Another object of the invention is to provide a conduit forming a part of the wall construction, in which the detachable cover plate may be readily removed when it is desirable to gain access to the conduit in the wall, and re-applied.

With the above and other objects in view the invention may be said to comprise the wall structure disclosed in the accompanying drawings hereinafter described and specifically set forth in the appended claims together with such variations and modifications thereof as may be apparent to one skilled in the art to which the invention appertains.

Reference should be had to the accompanying drawings, in which

Figure 1:
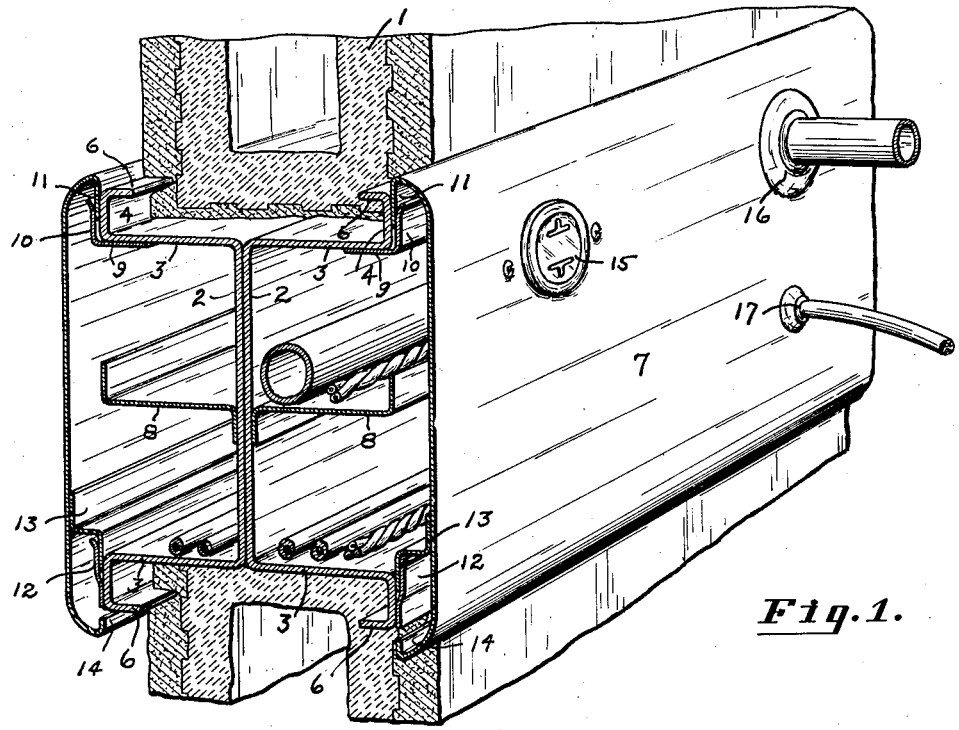
Figure 1 is a sectional perspective view showing a double conduit construction suitable to a partition wall with the channels opening upon opposite sides of the wall covered by a chair rail or molding.

The wall may be of any suitable construction, such as wood, metal or building tile, or other conventional wall materials may be used. In the drawings I have shown by way of example a wall having a body portion 1 constructed of tile and in which a pair of horizontally disposed metal channel members 2 are interposed between horizontal courses of tile and form part of the body of the wall. The channel members 2 are arranged back to back with their flanges 3 extending to the opposite faces of the wall, the two channels forming an I-beam for supporting the portion of the wall above the same. In this modification both the upper and lower flanges of the channel members are bent at right angles at their outer ends and back upon themselves to form plaster grounds, these edge portions projecting beyond the body of the wall and having outer faces 4 in the plane of the surface of the plaster 5, and inturned edge flanges 6 which terminate just short of the face of the body of the wall to which the plaster is applied, so that after the plaster is applied the flanges 6 are embedded therein. The open sides of the channels are covered by means of a sheet metal chair rail or molding 7 detachably secured to the edge portions of the channel flanges. The conduits may be provided with any suitable partition or shelf members 8 which may be secured to the webs of the channels and serve to divide the conduit and form an additional support for pipes or electric wires.

In the example shown in Fig. 1 where a narrow wall is shown the webs of the channel members may extend into the wall sufficiently to be disposed so that their backs engage. If, however, the wall in which these channel members are to be applied is wider, the backs or web portions may be spaced apart and still serve to support the upper portion of the wall.

In order to provide an easily detachable connection for the chair rail or molding strips, clips 9 are attached to the upper flanges of the channel members, the clips having flanges 10 extending upwardly along the faces 5 at the edges of the channels to provide retaining pockets for inturned edge flanges 11 of the chair rail or molding. The clips or strips 12 are secured to the edge faces 4 of the lower flanges of the channels and provide retaining pockets for downturned flanges of angle retaining strips or clips 13 secured to the inner faces of the chair rails or moldings.

The chair rails or moldings are preferably of slightly greater width than the channels to entirely conceal the channels and the joints between the plaster and the edge of the channels, the inturned flanges 11 at the upper edge of the rail or molding bearing upon the plaster above the channel and the lower edge of the rail or molding being provided with a flange 14 bearing against the plaster below the channel.

The chair rails or moldings may be provided with plugs 15 for connection to the electric wires in the conduits and also with suitable outlets such as indicated by numerals 16 and 17 for connections extending from the pipes within the conduit.

Figures 2, 3, 4:
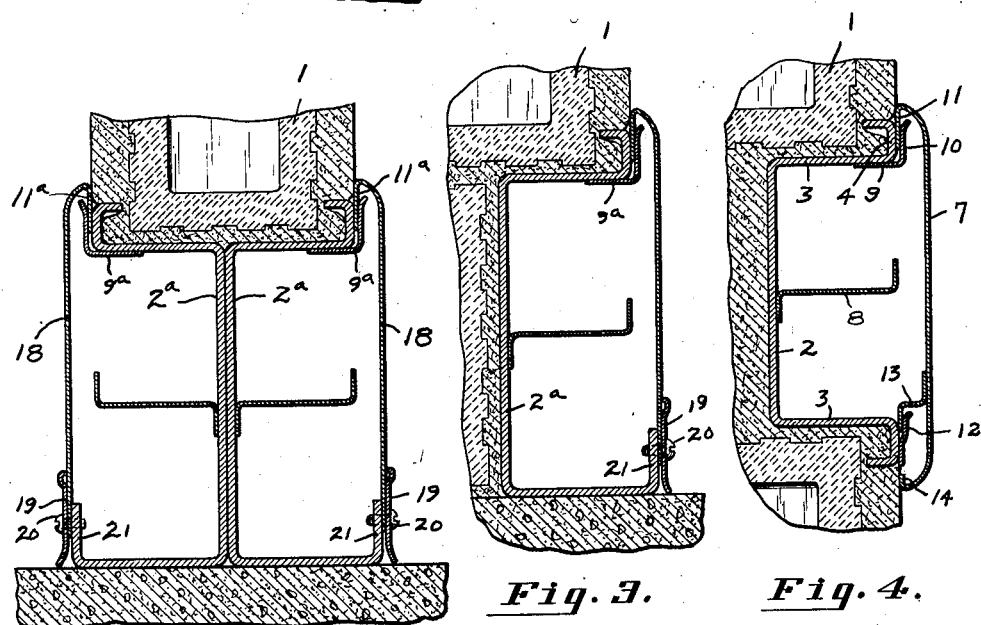
Fig. 2 is a sectional view showing a double conduit construction in which the channels are covered by base plates.
Fig. 3 is a fragmentary section showing a single conduit construction suitable for an outside wall of a building and showing a base plate for covering the open side of the channel.
Fig. 4 is a fragmentary section showing a single conduit with a chair rail or molding covering the open side of the channel.

The construction shown in Fig. 2 is similar to that shown in Fig. 1 except that in this instance the structural channel members 2ª extend along the floor and the covers are in the form of sheet metal base plates 18 which have inturned flanges 11ª corresponding to the flanges 11 of the chair rail or molding above described and which are adapted to fit in pockets formed by angle clips 9ª secured to the upper flanges of the channels. To the lower edge of the base plates 18 are metal floor strips 19 which are secured by suitable means such as screws 20 to upstanding flanges 21 provided at the outer edges of the lower flange of the channels.

Figs. 3 and 4 show single conduit constructions suitable for an outer wall or for one side of an interior wall of a building. Figs. 3 and 4 show constructions corresponding to those shown in Fig. 2 and Fig. 1 respectively, except that instead of providing two channel shaped structural members back to back a single channel shaped member is embedded in the wall with its open side at the inner face of the wall. In Fig. 3 the parts are designated by the same reference numerals as the corresponding parts in Fig. 2 and in Fig. 4 the parts are designated by the same reference numerals as the corresponding parts in Fig. 1.

It is to be understood that the base plates shown in Figs. 2 and 3 and the chair rail or molding shown in Fig. 4 may be provided with plugs and outlets such as are illustrated in Fig. 1. In all the modifications illustrated the conduit is entirely within the wall and entirely concealed by the base plates, chair rails or moldings and since the conduits are entirely within the wall and base plates, chair rails or moldings which conceal the conduits may be of the usual construction and appearance so that the advantages of an open conduit are obtained without waste of room space and without detracting from the appearance of the wall.

It will be seen that the channel shaped members 2 may be of greater unit length than the usual tiles or wall units, so that less labor is required to install them and the weight of the wall will be distributed over greater lengths of floor space, and thus avoid the tendency for cracking of the wall.

It will also be seen that with my construction considerable labor is saved in laying that part of the wall made of the channel shaped members 2 and in the elimination of the necessity for separately attaching grounds.

It will thus be seen that I have provided a simple and efficient structure for carrying supply lines in a wall and which forms a part of the wall structure, thus replacing certain of the wall elements, thereby saving the cost of such elements.

Attention is called to the fact that while I have shown metallic channel shaped members with their flanges placed back to back it is obvious that any suitable members having vertical webs and horizontal flanges may be used to aid in the support of the portion of the wall, such flanges extending toward the interior or toward the exterior of the wall.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A wall construction including a channel shaped load supporting metallic structural member embodied in and constituting part of the wall, said structural member having its web in upright position and its open side toward the outside of the wall, and a cover extending along the open side of said channel member, said channel and cover forming a conduit in the wall.

2. A wall construction including a channel shaped load supporting metallic structural member embodied in and constituting part of the wall, said structural member having its web in upright position and its open side toward the outside of the wall, the edge of a flange of said channel member being formed to provide a plaster ground, and a cover extending along the open side of said channel member, said channel and cover forming a conduit in the wall.

3. A wall construction including a channel shaped load supporting metallic structural member embodied in and constituting part of the wall, said structural member having its web in upright position and its open side toward the outside of the wall, and a sheet metal cover detachably secured to the open side of said channel member.

4. A wall construction including a channel shaped load supporting metallic structural member embodied in and constituting part of the wall, said structural member having its web in upright position and its open side disposed toward the outside of the wall, and a partition member within the channel-shaped structural member and secured to said web, said partition being adapted to support supply lines in said conduit.

5. A wall construction including a channel shaped load supporting metallic structural member embodied in and constituting part of the wall, said structural member having its web in upright position and its open side toward the outside of the wall, and a cover extending along the open side of said channel member, said channel and cover forming a conduit in the wall adapted to receive electric current supply lines, and said cover having outlet means for said supply lines.

6. A wall construction including a load supporting metallic structural member embedded in the wall and forming a support for a portion of the wall, said member having a supporting web disposed in upright position within the wall and having flanges extending outwardly to one side of the wall, and a detachable cover plate extending along the outside of the wall and arranged to enclose the open side of the structural member, whereby a conduit is formed in the wall, which conduit is adapted to receive supply lines.

7. A wall construction including horizontally disposed load supporting channel shaped metallic structural members embodied in the wall to form a part thereof and arranged back to back with their open sides toward the faces of the wall, and cover plate members secured to the open sides of the channels to form conduits in the wall adapted to receive supply lines.

8. A wall construction including a horizontally disposed load supporting channel shaped metallic structural member embedded in and constituting a part of the wall and having its flanges extending to a face of the wall, a flange of said member being bent back upon itself to form a plaster ground, and a cover plate detachably secured to the flanges of the channel member and projecting beyond the wall ground to completely cover the wall ground.

9. A wall construction including a load supporting metallic structural member embedded in the wall and forming a support for a portion of the wall, said member having a supporting web disposed in upright position within the wall and having a flange extending substantially horizontally in the wall to aid in supporting the wall, and a detachable cover plate extending along the outside of the wall and arranged to enclose the structural member, whereby to form a conduit in the wall, which conduit is adapted to receive supply lines.

10. A wall construction, including a load supporting metallic structural member embedded in the wall and forming a support for a portion of the wall, said member comprising vertically spaced horizontally extending members, each having an outer edge extending along a face of the wall, vertical members supporting and rigidly connecting said horizontally extending members, whereby an open conduit is formed in the wall which supports a portion of the wall and is adapted to receive supply lines, and a detachable plate extending along said face of the wall and forming a cover for one side of the conduit.

In testimony whereof I affix my signature.

HERBERT N. PUTNAM.